Feb. 9, 1926.

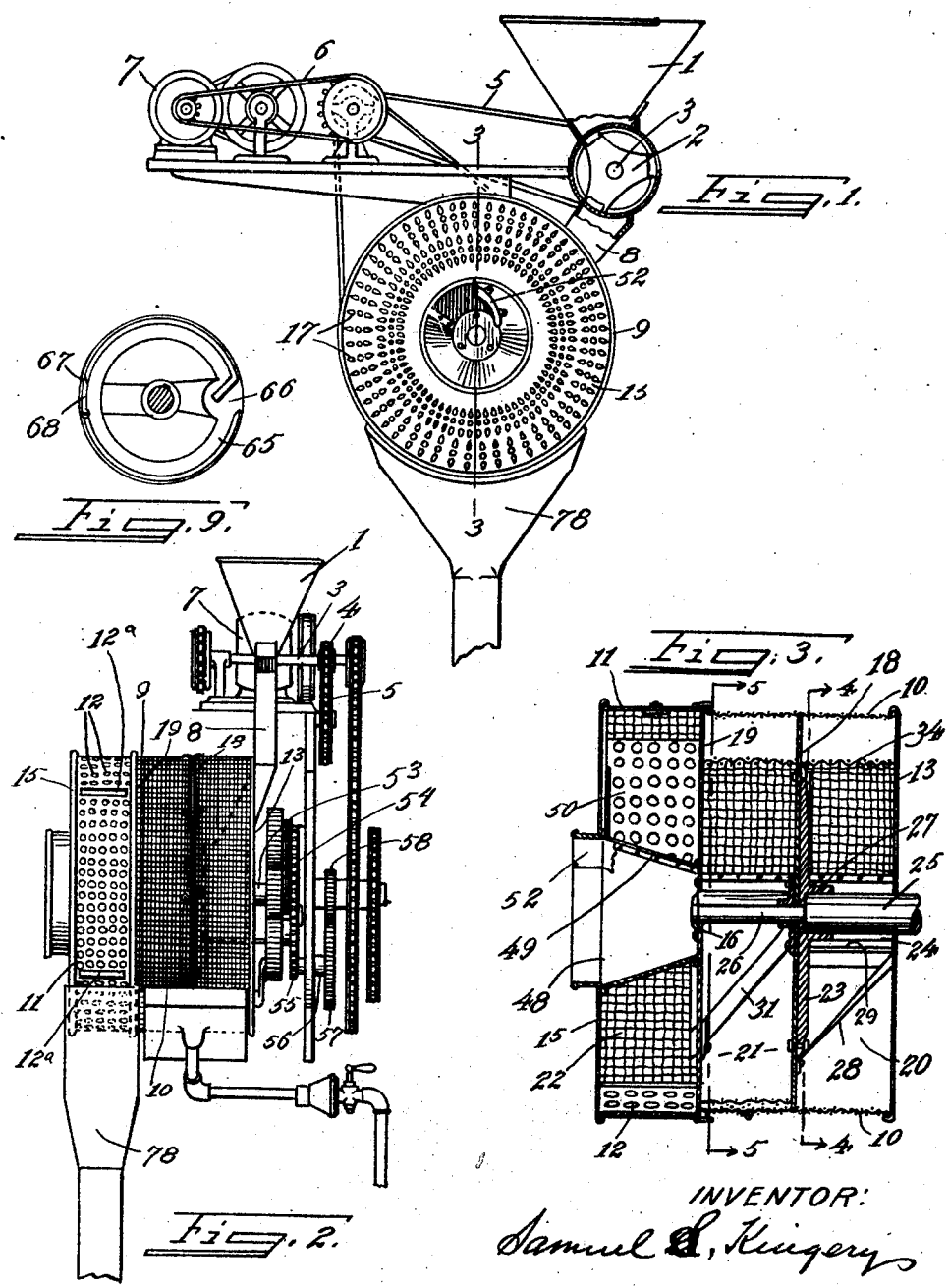
Feb. 9, 1926.  
S. S. KINGERY  
CORN POPPING MACHINE  
Filed Oct. 19, 1923      2 Sheets-Sheet 1
1,572,437
INVENTOR:  
Samuel S. Kingery  
BY  
Allen & Allen  
ATTORNEYS.

S. S. KINGERY

CORN POPPING MACHINE

Filed Oct. 19, 1923

INVENTOR:
Samuel S. Kingery
BY
Allen & Allen
ATTORNEYS.

Patented Feb. 9, 1926.

1,572,437

UNITED STATES PATENT OFFICE.

SAMUEL S. KINGERY, OF NORWOOD, OHIO.

CORN-POPPING MACHINE.

Application filed October 19, 1923. Serial No. 669,559.

*To all whom it may concern:*

Be it known that I, SAMUEL S. KINGERY, a citizen of the United States of America, residing at Norwood, in the county of Hamilton and State of Ohio, have invented new and useful Improvements in Corn-Popping Machines, of which the following is a specification.

This invention relates to improvements in popping cylinders, and has particular application to power driven corn popping machines of the type patented by Charles E. McCarren, Patent No. 1,196,563, and assigned to me.

The McCarren machine has a popping cylinder having three compartments, the first two being covered with a wire screen but the third having an outer wall made of a perforated metal sheet. The three compartments are divided from each other by vertical partitions, said partitions having suitable openings provided with chutes leading from one compartment to the next until the unpopped corn has been subjected to heat treatment for a reasonable time to insure popping thereof. The first two compartments in this machine are also provided with an inner, coarser screen, so placed with relation to the outer screen, that it will hold the popped corn away from the source of heat, while allowing the unpopped corn to sift through and be returned to the outer screen. This process continues until a certain number of revolutions have been made by the cylinder, when the door to the next compartment is opened and the entire mass is allowed to pass into the second compartment for similar treatment, from whence, after a like period of time, it is passed in like manner into the last compartment where the unpopped refuse is separated from the popped corn. The former is sifted through the perforations in the peripheral wall into a receiving trough, while the latter is caught up and ejected from the machine through a funnel shaped hopper.

It will be readily seen from the foregoing description, that in the McCarren machine, the popped corn is carried in the compartments with the unpopped corn during the entire length of time set for treatment in each of the first two compartments, thus subjecting the popped corn more or less unnecessarily to the heat, causing it to lose in flavor and appearance, and unnecessarily retarding its passage through the machine.

It is the purpose of my invention to provide a popping cylinder that will cause the popped corn to become instantly separated from the unpopped corn and to discharge it instantly from the machine in the quickest possible manner, at the same time retaining the unpopped corn in the heating compartments sufficiently long to insure the thorough popping thereof.

A further object of my invention is to simplify the construction of the parts mentioned so as to insure a comparatively low cost of maintenance and an efficient and effective operation of the machine.

With the above objects in view, my invention consists in the construction hereinafter described, and falling within the scope of the claims.

In the accompanying drawings—

Figure 1 is a front elevation of a corn-popping machine of the type referred to with the parts of my invention attached.

Figure 2 is a side elevation of the above.

Figure 3 is a vertical section of my improved popping cylinder taken on line 3—3 Figure 1.

Figure 9 is the slotted ring employed to operate the ejecting valves.

Figure 4:
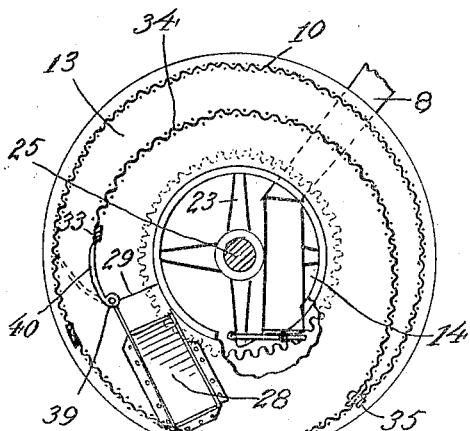
Figure 4 is a cross section of above taken on line 4—4 Figure 3.
Figure 5:
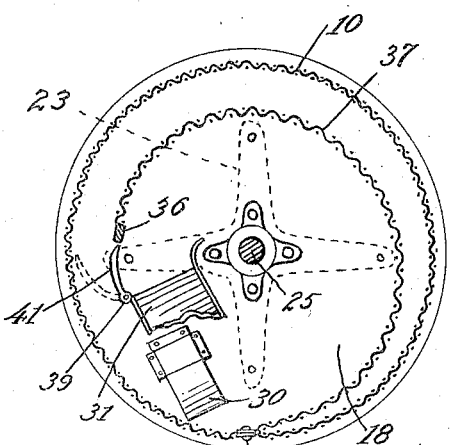
Figure 5 is a cross section of my popping cylinder taken on line 5—5 Figure 3.
Figure 6:
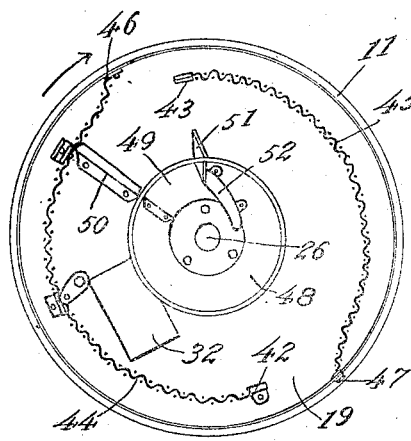
Figure 6 is an end elevation of the above with the cover removed showing the separating and delivering compartments.
Figure 7:
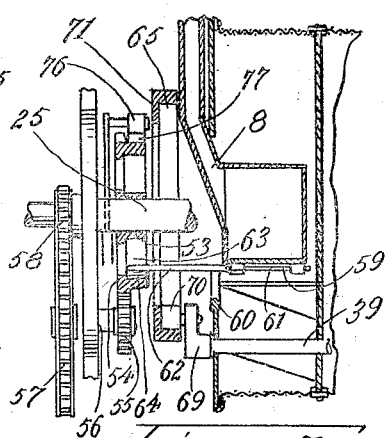
Figure 7 is a vertical section of the first compartment of the popping cylinder showing the operating mechanism of the feed and ejecting valves.
Figure 8:
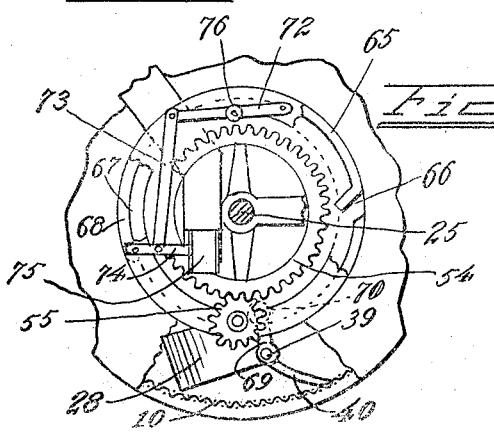
Figure 8 is an end elevation with portions broken away of the parts shown in Figure 7.

Referring to the drawings in detail, 1 indicates a hopper constructed of a suitable material and supported by appropriate means. Disposed at the lower end of the hopper 1, and adapted to communicate with it, is a measuring valve 2, operating upon a shaft 3, having upon it and keyed thereto, a sprocket wheel 4, which is connected through a series of chain drives 5 and 6 to the source of power 7. Communicating with the measuring valve. is a conduit 8, the lower end of which is disposed in one end of the popping cylinder 9.

In this instance the popping cylinder 9 comprises a peripheral wall formed of a wide section of fine wire screen 10 and a relatively narrow section of metal 11, perforated as at 12, and slotted as at 12$^a$.

Each perforation is slightly greater in diameter than the size of the grains of raw corn. The meeting edges of the fine wire mesh 10 and metal band 11, are suitably fastened to each other, while secured to the remaining edge of the wire mesh 10 is a circular plate 13, having a large opening 14 concentrically of the axis of the cylinder. Similarly the remaining edge of the metal band 11, carries a circular plate 15 having a circular opening 16 concentrically of the axis of the cylinder, and furthermore perforated as at 17.

Disposed within the section 10 and centrally of that section is a circular division plate 18, while disposed within the cylinder at the meeting ends of the wire mesh 10 and the metal band 11, is a circular division plate 19, cooperating with the plate 18 and the two plates 13 and 15 to divide the cylinder into three compartments 20, 21 and 22. Secured centrally to the division plate 18 is a spider 23, having a collar 24 to receive the end of the driving shaft 25, by means of which the cylinder is rotated; said driving shaft being secured to the cylinder by means of the bolt 26 extending through the plates 19 and 18 and being screwed into the end of the driving shaft 25. The shaft is further secured against independent rotation by means of a pin 27 passing through a suitable slot in the collar 24 and then into a hole provided near the end of the shaft 25. Secured to the rear surface of the plate 18, at a point between the center of the plate and its periphery, and disposed in the central compartment 21 is a chute 31, similar to the chute 28 in construction and position and similarly opening into the compartment 22 through an opening 32 in the plate 19.

Secured between the plates 13 and 18 at a point between the center and periphery and fastened thereto by suitable means is a post 33, to which is secured a coarse wire screen 34 arranged spirally of the periphery of the compartment 20 in due course meeting the peripheral wall 10 at 35 and fastened securely thereto, thus serving together with the outer wall of the chute to divide the compartment into inner and outer compartments. Similarly secured by a post 36, disposed between the plates 18 and 19 is a coarse wire screen 37 also arranged to pursue a spiral course and meet the periphery of the compartment 21 at 38, thus dividing it into an inner and an outer compartment. Journaled in aligning openings formed in the plates 13, 18 and 19 is a shaft 39 disposed adjacent to the outer edges of the mouths of the chutes 28 and 31, and fixed to the shaft 39 are doors 40 and 41, disposed in the compartments 20 and 21 respectively, and swinging between the posts 33 and 36 and peripheral wall 10. The purposes of this construction will be duly described hereinafter.

Secured to the division plate 19 at a distance from the peripheral wall 11 and extending into the compartment 22, at right angles to the plane of plate 19, are two posts 42 and 43, secured to which are strips of coarse wire screens 44 and 45; said screens following the course of the peripheral wall 11 and meeting said wall at 46 and 47, are secured thereto, thus dividing the compartment 22 into two semicircular outer compartments and a central compartment.

Secured to the division plate 19 and disposed within the compartment 22, concentrically of the axis thereof, is a discharge hopper 48 preferably frusto-conical in shape, having the relatively small end secured to the division plate 19 and the other end projecting through the opening in plate 15. In the side wall of the discharge hopper and within the front compartment is an opening 49, and extending from one side of the opening to the inner surface of the screen partition 44, is a perforated metal plate 50. Extending from the opposite side of the opening outwardly from the hopper is a baffle plate 51. These plates 50 and 51 are so arranged as to direct the material into the hopper 48. Another baffle plate 52, fastened to the inner wall of the hopper and following a spiral course outwardly, serves to direct the popped corn from the hopper.

The mechanical operation of my machine is similar to the operation disclosed in the McCarren patent upon which device my machine is designed as an improvement.

The driving shaft 25 being journaled to horizontally aligned bearings and capable of rotary motion, supports the popping cylinder in the manner described above. Loosely surrounding the shaft 25 and spaced apart a short distance from the bearing collar 53 is a spur gear 54 meshing with a similar pinion 55, surrounding a stub shaft 56, and similarly keyed upon said stub shaft is a spur gear 57, meshing with the pinion 58 keyed upon the shaft 25, so that in rotating the shaft 25, motion will be imparted to the spur gear 54 thru the medium of the pinion 58, gear 57 and pinion 55. The lower end of the conduit 8 where it is disposed within the compartment 20, is provided with a swinging shutter 59, and connected to the pivoted end of the shutter is a crank end 60 of a rod 61. The remaining end of the rod is formed with a crank 62, disposed within a groove 63 formed in the inner face of the spur gear 54 and having a depression 64 in the wall thereof to allow the crank end 62 to fall therein.

Disposed concentrically of the shaft 25 inwardly of the spur gear 54, is a stationary ring 65, formed at one side with a slot 66, having walls thereof inclined downward and inward, and at the diametrically opposite point, provided with another slot 67 having the walls thereof inclined upwardly. Pivoted to the lower wall of the slot 67 is a gate 68, capable of swinging movement and adapted to open slot 67 by swinging outwardly of the ring. Slots 66 and 67 are disposed in a horizontal plane.

A crank arm 69 secured to the outer end of the shaft 39, said shaft carrying the doors 40 and 41, has a crank pin at its outer edge upon which a roller 70 is journaled, said roller riding upon the ring 65 during the rotation of the cylinder 9. The rear edge of the ring 65 is formed with an inwardly extending flange 71, upon the rear surface of which is pivoted an arm 72. The arm 72 is at its remaining end, pivotally connected with one extremity of the link 73, the other end of which is pivotally connected to the gate 68 at its pivotal end and has a counter weight 75 disposed at its other end.

Journaled upon a pin carried by the arm 72, is a roller 76 which comes in contact with a cam shoe 77 carried by the outer face of the spur gear 54; said cam shoe being disposed outwardly of the groove 63 in such spur gear. The details of power transmission are identical with those in the McCarren machine.

In practice the raw corn is delivered from the hopper 1 by the measuring valve 2, into the conduit 8, and flows through the latter into the container at the bottom of said conduit. In the rotation of the shaft 25 motion is transmitted to the spur gear 54 and after a predetermined quantity of corn has been delivered to the container at the bottom of the conduit 8, the depression 64 in the spur gear 54 is brought into registration with the crank 62 thereby relieving the crank of the influence of the wall of the groove 63 and permitting the shutter 59 to swing open, and so deliver the contents of said container into the compartment 20 of the cylinder 9. Normally the roller 70 on the crank arm 69 rides on the outer surface of the ring 65, but after the cylinder has made a certain number of revolutions, dependent upon the ratio of the gearing between the shaft 25 and the spur gear 54, the cam 77 engages the roller 76 on the arm 72, transmitting motion to said arm to actuate the gate 68 to open position, thereby directing the course of the roller 70 through the slot 67 to the inner surface of the ring 65.

This changing of the course of the roller 70 actuates the crank arm 69 causing the shaft 39 to make a partial revolution and impart a swinging motion to the doors 40 and 41 causing them to swing toward the peripheral wall of the cylinder. In due time the rotation of the cylinder brings the roller 70 to the slot 66, when it is again diverted to the outer surface of the ring 65, causing the doors 40 and 41 to swing back to their normal position.

Referring now again to the improvements embodied in my invention; in the compartments 20 and 21 the corn is brought in contact with the source of heat. Upon entering compartment 20 the unpopped corn readily sifts through the screen 34 and is rolled around upon the peripheral screen 10 in close proximity to the fire. The grains that pop soon however, can not pass the screen 34 and in the course of rotation of the cylinder this popped corn is picked up by the screen 37 and delivered through the chute 31 into the last compartment 22 and over the screens 44 and 45 to the discharge hopper 48 and out of the machine.

The unpopped corn in compartment 20 is retained therein until the door 40 is caused to swing open against the peripheral screen 10 by the combination of movements described above, when all the unpopped corn is delivered through the chute 28 into the central compartment 21, fresh corn being simultaneously admitted through the conduit 8 into the compartment 20.

In compartment 21 the same process as described as occurring in compartment 20 is repeated, and the popped corn and the unpopped refuse is finally transferred through chute 31 into the last compartment 22. In this compartment the refuse readily sifts through the screens 44 and 45, and rolling by gravity over the inner surface of the perforated peripheral wall 11, finds its way through to perforations 12 into the hopper 78 whence it passes out of the machine. The popped corn remaining is taken up by the screens 44 and 45 and rolling over them by gravity is intercepted by the plate 50 and directed out through the discharge hopper 48.

Having thus described my invention, what I claim as new and desire to secure by Letters Patent, is:—

1. In a corn popping machine, a cylinder capable of rotary motion and divided vertically by partitions into a number of compartments adapted to receive corn, chutes carried by the partitions to establish communication between the compartments whereby corn will be delivered from one compartment to another by rotation of the cylinder, means for heating said cylinder, means for rotating said cylinder, a coarse screen dividing each compartment into an inner and outer chamber for separating the unpopped corn from the popped corn in each compartment and an open chute for discharging the popped corn from the inner chamber of each compartment continuously and irrespective of the unpopped corn and means for periodically opening the outer chamber into the chute.

2. In a corn popping machine, a cylinder capable of rotary movement and divided vertically by partitions into rear, center and front compartments, adapted to receive corn, chutes carried by the partitions establishing communication between said compartments, whereby the corn will be delivered from one compartment of the cylinder to another by the rotation of the cylinder, means for heating said cylinder, means for rotating said cylinder, a coarse screen dividing each compartment into an inner and outer chamber for separating the popped corn from the inner chamber of each compartment continuously and irrespective of the unpopped corn the coarse screen having a valve portion at the open chute for opening the outer chamber periodically into the chute.

SAMUEL S. KINGERY.